United States Patent
Roskind et al.

(10) Patent No.: US 8,943,275 B1
(45) Date of Patent: *Jan. 27, 2015

(54) DIFFERENTIAL STORAGE AND EVICTION FOR INFORMATION RESOURCES FROM A BROWSER CACHE

(71) Applicants: Jim Roskind, Redwood City, CA (US); Jose Ricardo Vargas Puentes, San Jose, CA (US); Ashit Kumar Jain, San Jose, CA (US); Evan Martin, Mountain View, CA (US)

(72) Inventors: Jim Roskind, Redwood City, CA (US); Jose Ricardo Vargas Puentes, San Jose, CA (US); Ashit Kumar Jain, San Jose, CA (US); Evan Martin, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/850,030

(22) Filed: Mar. 25, 2013

Related U.S. Application Data

(63) Continuation of application No. 12/551,244, filed on Aug. 31, 2009, now Pat. No. 8,417,892.

(60) Provisional application No. 61/237,969, filed on Aug. 28, 2009.

(51) Int. Cl.
G06F 12/00 (2006.01)
G06F 12/08 (2006.01)

(52) U.S. Cl.
CPC .................... *G06F 12/0891* (2013.01)

USPC .......................................... 711/133; 711/134

(58) Field of Classification Search
CPC ....... G06F 12/12; G06F 12/121; G06F 12/127
See application file for complete search history.

(56) References Cited

U.S. PATENT DOCUMENTS

| | | | |
|---|---|---|---|
| 7,844,590 B1 * | 11/2010 | Zwicky et al. | 707/706 |
| 8,127,079 B2 | 2/2012 | Heil et al. | |
| 2003/0079086 A1 * | 4/2003 | Shanahan et al. | 711/133 |
| 2006/0069746 A1 * | 3/2006 | Davis et al. | 709/218 |
| 2010/0095067 A1 | 4/2010 | Kosaraju et al. | |
| 2010/0281218 A1 | 11/2010 | Shen et al. | |
| 2010/0313079 A1 | 12/2010 | Beretta et al. | |

OTHER PUBLICATIONS

Mustain, A. Elein, "The Saga of the ARC Algorithm and Patent Discussions on Development", PostgreSQL General Bits Newsletter, Issue 96, http://www.varlena.com/GeneralBits/96.php, Feb. 6, 2005 (4 pages).

* cited by examiner

*Primary Examiner* — Baboucarr Faal
(74) *Attorney, Agent, or Firm* — Sterne, Kessler, Goldstein & Fox P.L.L.C.

(57) ABSTRACT

Systems, methods and a computer program product the differential storage and eviction for information resources from a browser cache. In an embodiment, the present invention provides differential storage and eviction for information resources by storing fetched resources in a memory and assigning, with a processor, a persistence score to the resources. Further embodiments relocate the resources from a sub-cache to a different sub-cache based on their persistence score, and remove the resource from the memory based on the persistence score.

30 Claims, 7 Drawing Sheets

DIFFERENTIAL STORAGE AND EVICTION FOR INFORMATION RESOURCES FROM A BROWSER CACHE

CROSS REFERENCE TO RELATED APPLICATIONS

This patent application claims benefit as a continuation of U.S. Pat. No. 8,417,892, entitled "Differential Storage and Eviction for Information Resources from a Browser Cache," filed on Aug. 31, 2009, which claims benefit of U.S. Provisional Patent Application No. 61/237,969 filed on Aug. 28, 2009, entitled "Differential Storage and Eviction for Information Resources from a Browser Cache," both of which are incorporated by reference herein in their entirety.

FIELD OF THE INVENTION

The present invention relates to cache technology.

BACKGROUND OF THE INVENTION

In computer science, a cache is a collection of data that duplicates values stored elsewhere, where the original data is expensive to fetch or recompute, compared to the cost of reading the cache. A web browser is a software application that allows a user to view or download resources that are available on a network, such as on a website on the World Wide Web. Browsers are used to retrieve, access and view resources. Resources include both information resources, e.g., passive content such as text, images, and 'active' resources, e.g., scripts such as JAVASCRIPT. Browsers run on personal computers and mobile devices. Commonly used browsers presently include, for example, GOOGLE CHROME available from Google Inc., FIREFOX available from Mozilla, INTERNET EXPLORER available from Microsoft Corp., SAFARI available from Apple. Inc. and OPERA from Opera Software, ASA.

Web browsers use caches to improve the performance of the access and viewing functions. Interaction with web resources is most effective when it is responsive, e.g., happens without 'lag' or delay between request and display. In some cases, a user interface of a browser may become unresponsive due to improper rendering of content for display. A browser's user interface may also become unresponsive if it is waiting for content to be rendered for display. Browser caches may be used to reduce the lag of resource presentation and otherwise improve the performance of a web browser.

Because caches are finite in size, in order for new resources to be stored in the cache, other resources must be 'evicted' or removed from the cache. Different strategies for deciding which data to store in, and evict from caches are used.

BRIEF SUMMARY

Embodiments of the present invention relate to systems and methods of differential storage and eviction for information resources from a web browser cache. According to an embodiment, a computer-implemented method is provided. The computer-implemented method includes storing a fetched resource in a memory and assigning, with a processor, a persistence score to the resource. According to additional embodiments, The computer-implemented method further includes removing the resource from the memory based on the persistence score and after the storing step and before the assigning step, determining the persistence score for the resource based on an at least one persistence factor.

According to another embodiment, a system is provided. The system includes a memory, implemented with a computing device, that is configured to store a resource and a differential storage manager, implemented with a computing device, that is configured to assign a persistence score to the resource, and place the resource in the memory. In another embodiment, the system includes an eviction manager, configured to remove the resource from the memory based on the persistence score. In yet another embodiment, differential storage manager is also configured to use post-processing modules to generate a post-processed version of the resource.

According to another embodiment, a computer program product is provided. The computer program product includes a computer usable storage medium having computer readable program code for causing a processor to execute the computer readable program code, the computer readable program code including code configured to cause the processor to store a fetched resource in a memory, code configured to cause the processor to determine the persistence score for the resource based on at least one persistence factor, code configured to cause the processor to assign a persistence score to the resource and code configured to cause the processor to remove the resource from the memory based on the persistence score.

Further features and advantages, as well as the structure and operation of various embodiments are described in detail below with reference to the accompanying drawings.

BRIEF DESCRIPTION OF THE DRAWINGS

Embodiments of the invention are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION

I. Overview
II. Operation of the System
III. Cache 120
a. Persistence Score 284
b. Persistence Factors 282A-N
   i. The importance of the Resource (Step 410)
   ii. The Characteristics of the Resource (Step 420)
   iii. The Characteristics of the Source of the Resource (Step 430)
   iv. The Usage Patterns of the Resource (Step 440)

IV. Differential Storage Manager 122
V. Resource Post Processing
VI. Examples
VII. Method
VIII. Example Computer System Implementation
IX. Conclusion

I. Overview

Embodiments described herein relate to the differential storage and eviction for information resources from a browser cache. While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility. The following sections describe the differential storage and eviction for information resources from a browser cache in greater detail.

It should be noted that references in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of one skilled in the art given this description to incorporate such a feature, structure, or characteristic in connection with other embodiments whether or not explicitly described.

II. Operation of the System

The term "resource" is used herein to broadly describe any item capable of being stored in a cache, e.g., files, images, video, sound, text, documents. As will be appreciated by those persons skilled in the art, some embodiments of the cache described herein are utilized for web browser caches, also known as browser caches or web caches. When a user requests a web resource, e.g., HTML Page, image, video, script, with their web browser, these documents are retrieved and selectively stored in the web cache. Though web caches generally retrieve resources from a network, resources referred to in embodiments herein do not need to be retrieved from the Internet or web, rather, without departing from the spirit of embodiments, resources could be received from any computerized source of information, e.g., local area network, wide area network, or storage devices.

Figure 1:
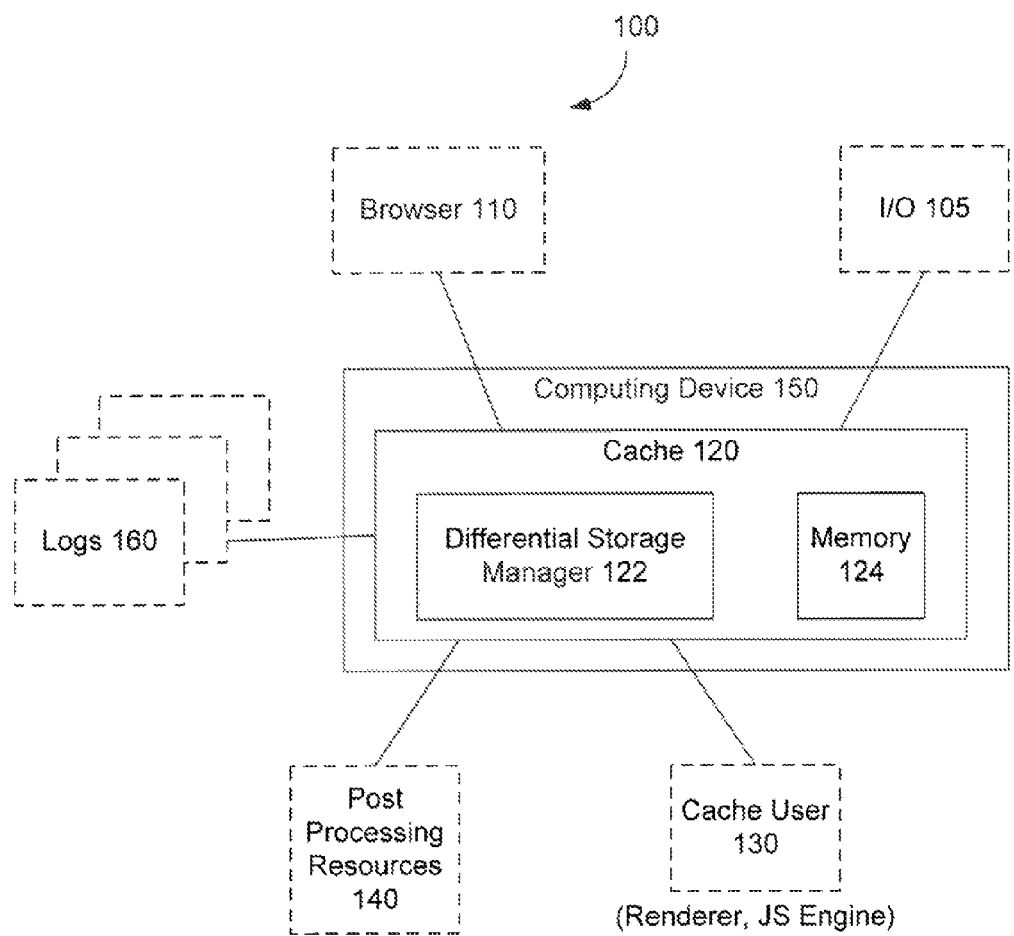
FIG. 1 is a diagram of a system according to an embodiment of the present invention.

FIG. 1 illustrates a system 100, according to an embodiment, that performs differential storage and eviction for information resources from a browser cache. System 100 includes a cache 120, a browser 110, an I/O 105 and a cache user 130. Cache 120 is computer-implemented, and as described further below in the discussion of FIG. 5, operates on a computing device 150. Cache 120 includes a differential storage manager 122, and a memory 124. Memory 124 performs the cache storage function, as would be known by those skilled in the art, such as providing a temporary storage area where accessed data can be stored for rapid reuse. Cache user 130, as will be appreciated by persons skilled in the relevant art, may contain a web rendering engine and a script engine. In an embodiment, the web rendering engine may process scripts that are included as a part of content retrieved by browser process. In an example, not intended to limit the invention, the web rendering engine may process JAVASCRIPT that may be a part of content retrieved by browser 110. In this example web rendering engine may be the WEBKIT, an open source web rendering engine available at web URL address "www-.webkit.org."

Broadly speaking, in embodiments described herein, resources are fetched from a network by the cache 120 through I/O 105, are stored in memory 124, and presented to the cache user 130. As will be described below with the discussion of FIG. 2, in embodiments, a differential storage manager 122 is included in the cache 120, and is configured to manage the storage of fetched resources in memory 124, including the resource placement in, and eviction from, the memory 124.

III. Cache 120

Figure 2:
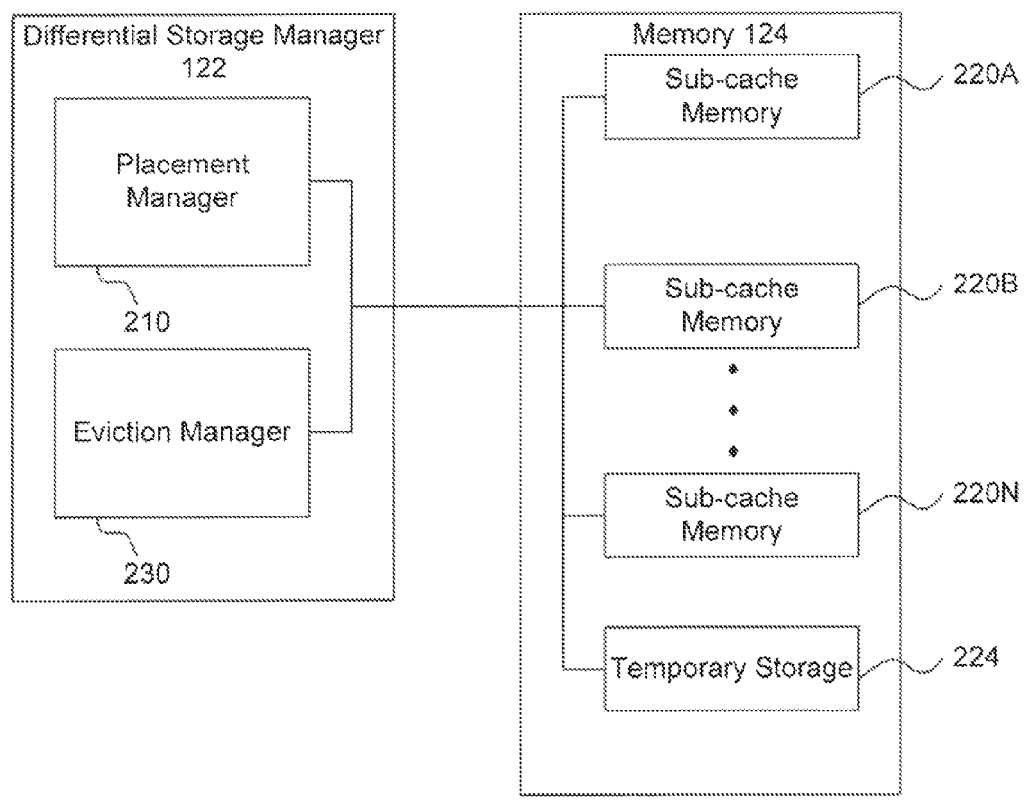
FIG. 2 is a diagram of a cache according to another embodiment of the present invention.

FIG. 2 illustrates a more detailed view of the cache 120, according to an embodiment of the present invention. Differential storage manager 122 includes a placement manager 210 and an eviction manager 230. In some embodiments, memory 124 is divided into a plurality of sub-cache memories 220A-N, also referred to herein as subcaches or sub-storage modules. In embodiments, these sub-cache memories may be physically separate, logically separate or some combination of these approaches. These subcaches perform cache storage functions, as would be known by those skilled in the art, such as providing a temporary storage area where accessed data can be stored for rapid reuse. In embodiments described herein, subcaches 220A-N store resources, retrieved by I/O 105, and provided to cache user 130.

Figure 3:
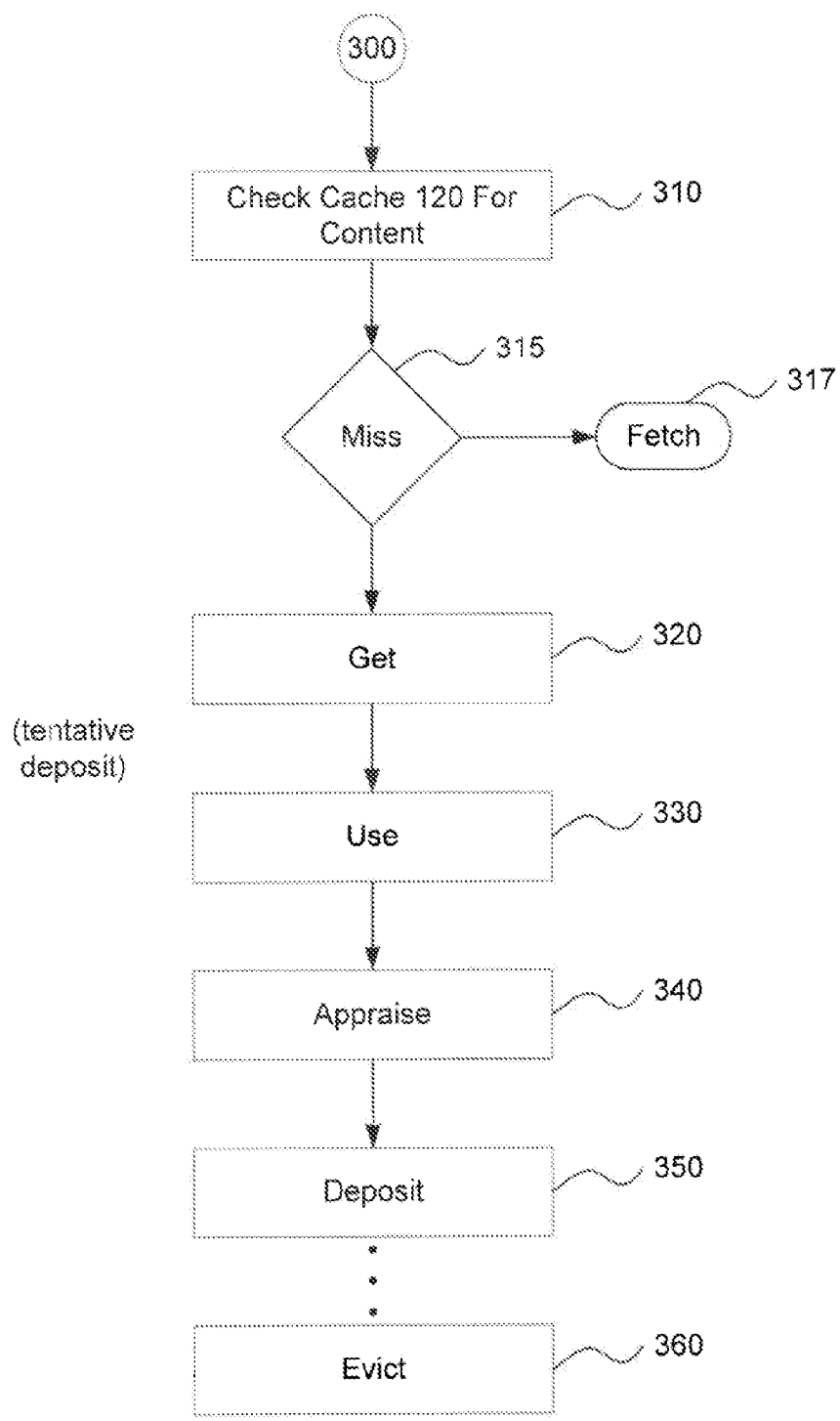
FIG. 3 shows example stages of differential storage and eviction in a cache, according to embodiments of the present invention.

As will be described below with the discussion of FIG. 3, according to an embodiment, placement manager 210 manages the placement of fetched resources in memory 124. The locations within memory 124, within which the placement manager 210 may place resources, are represented by sub-cache memories 220A-N. Placement manager 210 may select an initial placement for a fetched resource, and also may move a stored resource to another sub-cache memory 220 based on logic described below. According to embodiments, differential storage manager 122 also includes an eviction manager 230, configured to manage the removal of resources from memory 124 and subcaches 220A-N.

In embodiments, subcaches 220A-N may be able to store any resource type, or alternatively, each only be able to store a limited set of resource types. For example, subcache 220A may be configured to only be used to store JAVASCRIPT resources. In yet another example, subcache 220B is only able to store a set comprising a plurality of resource types, such set consisting of image types, e.g., JPG, PNG, TIFF, BMP. In examples, the set of resource types that may be stored in a subcache may be related data types, e.g., image-types, script-types, or unrelated data types.

In embodiments, subcaches 220A-N may have individual cache eviction policies that may all differ from each other, or at least two may share the same eviction policy. As described below, these eviction policies may be used by embodiments to guide the eviction manager 230 in its removal of cache-stored resources. For example, in one example approach, some sub-cache modules 220A-N could have traditional Least Recently Used (LRU) cache eviction policies while others could have more advanced policies. Additional eviction policies, implemented by embodiments, will be described below.

a. Persistence Score 284

One broad approach to storage and eviction of resources followed by some embodiments described herein involves the assignment of a 'persistence score' to each resource stored cache memory 124. In some embodiments, the persistence score is a number, and the higher the persistence score, the less likely it will be that the resource will be selected to be evicted from the memory 124. As an additional use of the persistence score, as described below, the placement manager 210 may manage the storage of resources based on the persistence score.

In embodiments, the assignment of the persistence score need not take place before a resource is stored in memory 124. A resource may be fetched, stored in a cache memory and a persistence score may be assigned at a later time. Only after the cache user 130 starts decoding and using the resource, as shown at step 330, can a more complete appraisal be obtained for the resource. In embodiments, this persistence score will be high for critical pieces, e.g., JAVASCRIPT that modifies the layout, and low for objects that don't block the page, e.g., a static image. This information then may be used by placement manager 210 to determine the placement of resource 280.

In embodiments, this persistence score may be predetermined, e.g., determined by an external resource and passed to the differential storage manager 122. For example, an HTML Tag could be created by a web page developer that would send a pre-determined persistence score along with a delivered resource. Such a pre-determined approach could allow developers to control how aspects of their page interact with the embodiments described herein.

b. Persistence Factors 282A-N

Figure 4:
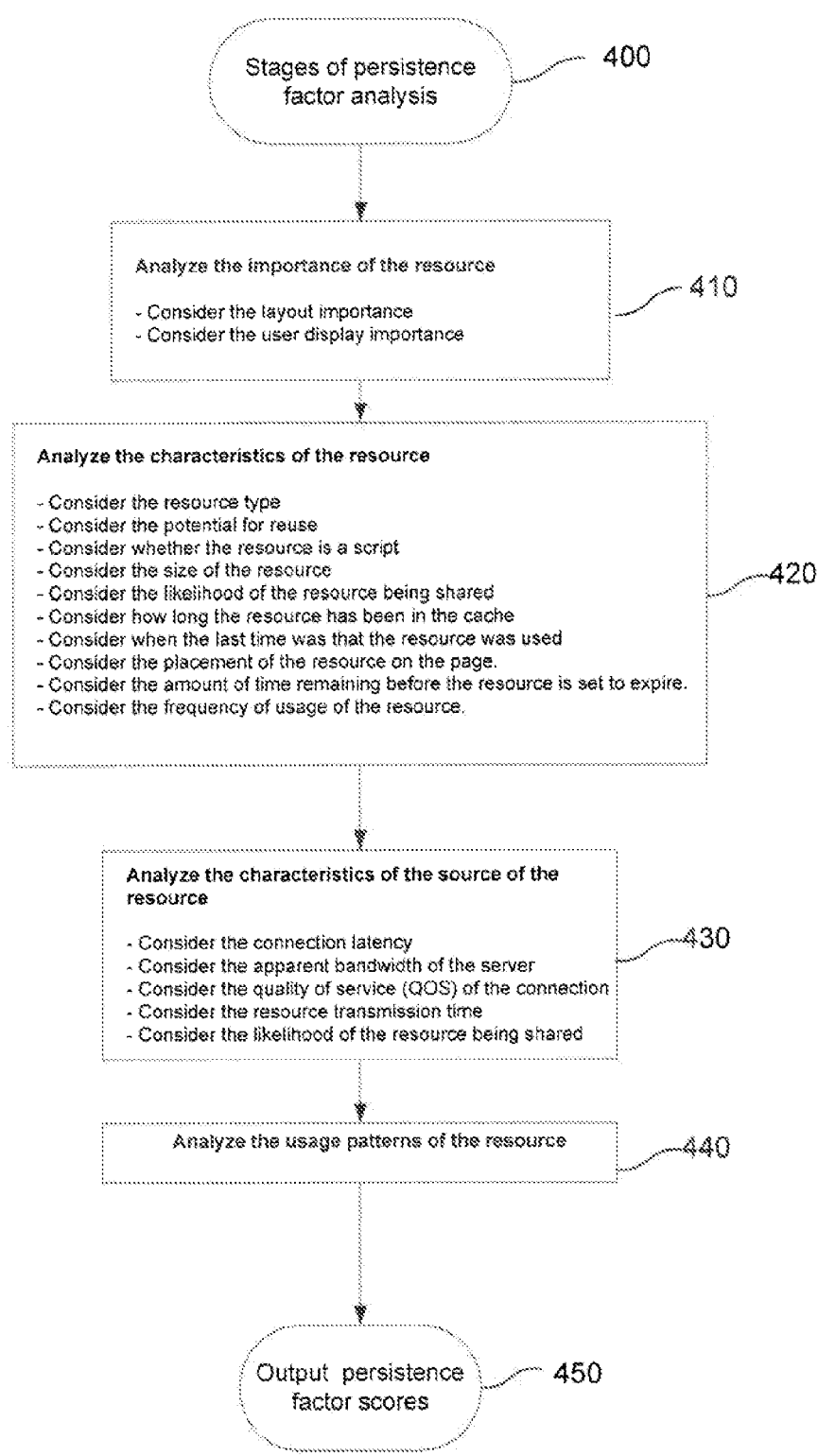
FIG. 4 shows example stages of persistence factor analysis according to embodiments of the present invention.

In FIG. 4, an alternative approach to determining the persistence score is depicted. As described below, some embodiments may determine a persistence score for a stored resource based on persistence factors. By using an appraisal step, as outlined on FIG. 4, and in step 340, one or more persistence factors are determined and weighed. As listed below, these factors are characteristics of a resource that are relevant for the placement of a resource within a memory, and the eviction of a resource from the memory. Embodiments consider these persistence factors in broad categories. Such categories are illustrative, not intended to limit the invention, potentially overlapping in their scope, and may contain similar or duplicate entries.

i. The Importance of the Resource (Step 410)

R1 Layout importance. This factor assesses whether a resource will significantly affect the layout of the entire web page for which it is included. Certain types of resources, e.g., certain scripts and CSS, have significant implications for the layout of the page.

R2. User Display Importance. This factor assesses whether the delay of a receiving a resource will block the display of an entire page. For example, if all resources are loaded on a page, except a specific image resource, and the page layout can be performed without the missing component disturbing the rest of the page, the page can be presented to the user and later on, when the image arrives, it is displayed in the correct place.

ii. The Characteristics of the Resource (Step 420)

In embodiments, the characteristics of the resource that are relevant include a variety of items. Some of the items may be determined from analyzing the resource, e.g., size, type, and some of the items may be determined from extracting metadata from the resource. In an example, as enumerated in stage 340 and step 420, the following characteristics of the resource may be assessed:

C1. The resource type, e.g., image, HTML page, document, script, CSS.

C2. Whether the resource is likely to be reused. Some resource-types, by definition are not likely to be reused. For example, if a resource is a video, there may not be not a high likelihood of reuse because users don't normally request the same video more than once within a short period of time.

C3. Whether the resource is a script. Because a script resource may cause a pause in the display of the entire page, their cache storage is important to the performance of the browser 110. In addition, if a resource is a script, embodiments will check to see whether a script 'remains active,' e.g., is currently executing, or is frequently executed. As will be apparent to persons skilled in the art, Least Recently Used (LRU) cache eviction strategies often do not effectively value a currently executing script. Some embodiments will assign a high persistence score to active scripts, so as to advantageously persist them longer in the cache.

C4. The size of the resource. Embodiments assess and weigh the size of the resource. While a larger resource takes longer to reload after eviction than a smaller resource, the larger resource also takes up more cache space. Embodiments may consider multiple factors in combination, e.g., resource size, and importance, so as to balance competing considerations.

C5. The likelihood of the resource being shared among related pages. Certain resources are more likely to be shared between pages on the same site, e.g., cascading style sheets (CSS) and JAVASCRIPT.

C6. Consider how long the resource has been in the cache.

C7. Consider when the last time was that the resource was used.

C8. Consider the placement of the resource on the page. For example, a script that is located near the bottom of the page may have less impact to page loading performance. Relative placement, absolute placement or a combination of the two features can be considered by embodiments.

C9. Consider the amount of time remaining before the resource is set to expire. For example, it could be more beneficial to discard JavaScript that is set to expire in an hour over another resource that has an expiration date a day away.

C10. Consider the frequency of usage of the resource. For example, in embodiments, a resource that is frequently used has a higher likelihood of being required again.

This example of features C1-C10 is illustrative and not intended to limit the invention. The persistence factor or factors may comprise one or more of the values based on aspects from C1-C10. These factors may be weighed by embodiments individually, or in combination. As would be apparent to a person skilled in the art given this description, other characteristics, features and metadata may be used to analyze resources so as to determined persistence factors and a resource persistence score.

iii. The Characteristics of the Source of the Resource (Step 430)

In embodiments, the characteristics of the source of the resource include a variety of items. For some embodiments, the 'source' of the resource is the server from which the resource has been immediately transferred. This source may, for example be a server on the Internet that transfers an HTML page resource, along with image and text resources, to the I/O 105. Some embodiments may collect information about the source of a resource from I/O 105. In practice, a single HTML page may integrate resources from several source servers, each source having its own distinct characteristics. In an example, the differential storage manager 122 may analyze and quantify the following characteristics of the source:

S1. The connection latency.

S2. The apparent bandwidth of the server.

S3. The Quality of Service (QoS) of the connection.

S4. The resource transmission time from the source.

This example of factors S1-S4 is illustrative and not intended to limit the invention. The source characteristics persistence factor or factors may comprise one or more of the values based on aspects from S1-S4. These factors may be weighed by embodiments individually, or in combination. As would be apparent to a person skilled in the art given this description, other characteristics, features and metadata may be used to analyze the source of a resource to determine persistence factors and resource persistence scores.

iv. The Usage Patterns of the Resource (Step 440)

In embodiments, one persistence factor is the usage patterns of the resource. These usage patterns may be pre-determined and supplied to embodiments by an external source, or the usage pattern may be determined by embodiments. Determining to usage pattern for a resource, in embodiments, involves the receiving of information corresponding to the usage of the resource.

One approach implemented by embodiments, is to keep resources in the cache that are determined to be reused often, and for a longer time than entries that are not determined as such. For example, an entry that was used 15 times and has not been used for two weeks may be more valuable than an entry that that only has been used 5 times, even if the last time was a week ago.

One source of usage information is the cache user 130 element of system 100. Specifically, in embodiments, feedback from the web rendering engine discussed above. Another source of information for embodiments to use to determine usage patterns is the logs 160 associated with the browser 110. Even if no feedback exists from cache user 130, logs 160 can be accessed to show resource usage information.

For example, resource A, an image, may be retrieved, stored in memory 124 and forwarded to cache user 130. In this case, at the time that resource A is stored, there is no feedback from the renderer in cache user 130. However, if the logs 160 are accessed it may be revealed that the browser 110 requests access to this resource regularly, and that the resource has been determined to change at regular intervals, e.g., every week. Retrieved at the same time as resource A, resources B and C however, a script and an HTML file respectively, could be determined to have the same regular access pattern but not the same change pattern. Resources B and C do not change at regular intervals like resource A.

Embodiments may treat the above example of resource A, B and C in different ways. One approach would be to treat resources B and C differently from resource A. Because resource A changes at a determined interval, e.g., every week, embodiments could regularly evict resource A, leaving B and C in the cache. Even on a day where a large amount of resources are downloaded and accessed, embodiments described herein could leave at least resources B and C, and potentially A, in the cache. Using a traditional LRU approach, because of the large amount of other resources accessed, resources A, B and C would be evicted. An embodiment that can make eviction decisions based on the determined reuse of a resource is said to he an 'adaptive cache.'

IV. Differential Storage Manager 122

As described above, differential storage manager 122 includes a placement manager 210 and an eviction manager 230. Embodiments divide memory 124 into a plurality of subcaches 220A-N. As described with the description of FIG. 2, embodiments of differential storage manager 122 may contain a placement manager 210. In embodiments, based on different factors, this placement manager manages the placement of cache-stored resources, placing the resource in one of the subcaches 220A-N.

In an example, as shown at stage 350, placement manager 210 may manage resource placement by removing the stored resource from its current location in memory 124 and placing it into a different portion of memory 124. In embodiments, these available portions correspond to subcaches 220A-N. Placement manager 210 may base its management on the following considerations:

PM1. The persistence score of the resource, as described above in section III(a).

PM2. One or more persistence factors, as described above in section III(b).

PM3. The benefits of storing the resource with other resources. As described herein, the performance of certain types of resources may improved by placing them together in a subcache.

This example of considerations PM1-PM3 considered by placement manager 210, is illustrative and not intended to limit the invention. The characteristics considered by the placement manager 210 may comprise one or more of the values based on aspects from PM1-PM3. These considerations may be weighed by embodiments individually, or in combination. As would be apparent to a person skilled in the art given this description, other characteristics, features and metadata may be used to determine the placement of a resource.

For example, if I/O 105 receives a movie resource, this resource may be initially stored by placement manager 210 in temporary storage 224, a portion of memory 124. At this point, the movie is presented to the user by the browser, but it also remains in the temporary storage 224. While stored in temporary storage 224, as described above, various persistence factors may be weighed with respect to this movie resource, and a persistence score may be determined. Based, for example on the type of the resource being a video, the placement manager 210 may store the resource in subcache 220A, with other multimedia resources. If, however, the usage pattern persistence factor described above shows that this movie resource is frequently accessed, it may be moved by placement manager 210 into a different subcache.

Eviction manager 230 is configured to manage the removal of resources from memory 124 and subcaches 220A-N. As will be understood by persons skilled in the art, the eviction process is triggered when a new information resource needs to be stored in a full cache. Like the operation of the placement manager 210, eviction manager 230 as shown at stage 360, in an example, may select resources for eviction based on different considerations. In embodiments, the "persistence" in the persistence score refers to information resources persisting in the cache, notwithstanding other resources being evicted. When considering whether to evict a stored resource, eviction manager uses all of the persistence factors discussed above, and the assigned persistence score. Without departing from the spirit of embodiments described herein, other factors and eviction strategies may also be used by eviction manager 230 during the completion of its management function.

V. Resource Post Processing

Once a resource has been stored in memory 124, embodiments described herein may direct processing modules to perform different processing tasks upon the stored resources. The processing tasks performed will be after the resource has been stored, and thus as described herein they are termed "post processing."

The post processing performed will depend upon the characteristics of the resource, e.g., downconverting an image to a lower resolution, interpreting a script, transcoding an image to a new format, translating an audio resource to a lower bitrate, scaling an image to a different size. Other useful post processing tasks would be apparent to a person skilled in the art given this description.

Figure 2A:
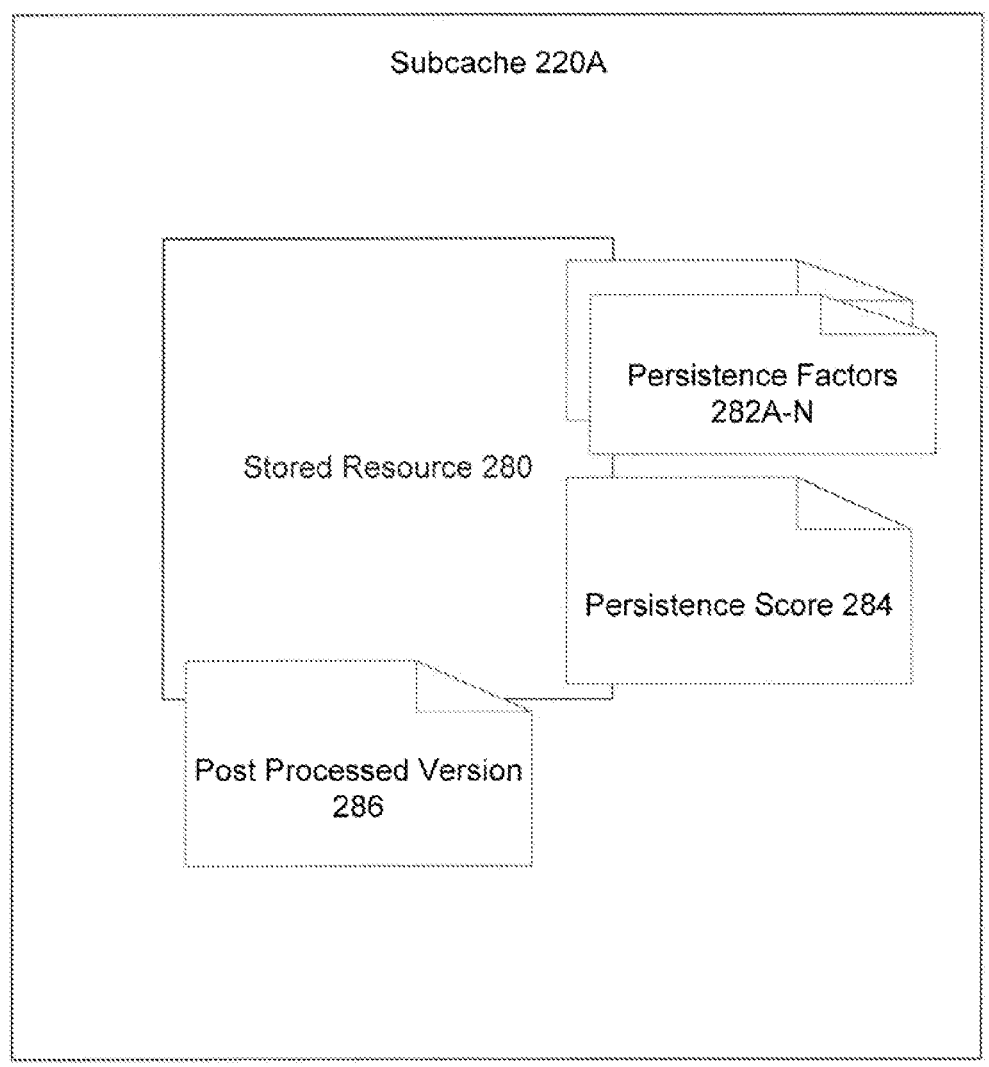
FIG. 2A is a diagram of a subcache and a stored resource according to an embodiment of the present invention.

Once the post-processed version of the stored resource 280 has been created by embodiments, the new post processed version 286 will be made available to replace, supplement or otherwise modify the original stored resource. One approach taken by embodiments, illustrated in FIG. 2A, involves having elements of the embodiment, e.g., the placement manager 210, append the post-processed version 286 of the stored resource 280 to the stored resource. By taking advantage of proximity, this appending approach may aid in this location and use of the post-processed version, for beneficial effect. Another approach taken by embodiments involves storing the post-processed version of the resource in a different data structure. In embodiments, this newly stored version of the resource may remain stored, even if the original resource is evicted.

As an example of this post-processing, if it is determined, from an analysis of the respective persistence factors 282, that an image resource is relatively large (step 420), and thus is taking a comparatively long time to load (step 430). To improve load-time, embodiments may perform post processing to create a lower resolution version of the image. Instead of being appended to the stored resource 280, this post processed version of the image may stored separately, and linked to the original image. In this example, even if the original, higher resolution image is evicted, cache user 130 may still rapidly layout the page, showing the post-processed lower resolution version of the image while the original version is re-fetched.

In another example, a stored script resource may be post-processed by interpreting or pre-parsing the script and storing the version for future use. Another approach, helpful for script reuse, is to take the 'Just-in-Time' (JIT) compiled version of a script after it has been used, and use it as a post-processed version of the script. Other examples of post-processed versions of a script include a tokenized version of the script, and a parsed version of the script. Other useful post-processing approaches to script or code would be apparent to a person skilled in the art given this description.

VI. Examples

The following section is an example of several embodiments. This example is illustrative and not intended to limit the invention.

A page "page.html," is requested, along with three additional resources named "style.css," "icon.jpg" and "script.js." Cache 120 is checked for each, according to step 310, to see if each are currently stored in memory 124. They are not, and according to step 317, each are fetched and stored in temporary storage 224.

According to step 320, they are retrieved from temporary storage 224, and used by cache user 130, according to step 330. Cache 120 component differential storage manager 122 commences step 340, beginning the appraisal of the persistence score and persistence factors of each resource.

As the resources are being used by cache user 130, the JAVASCRIPT engine and the rendering engine in cache user 130, determine that "script.js" is relatively more important for the layout of "page.html" than the "icon.jpg" or the "page.html" content itself, cache user 130 forwards this persistence factor analysis to differential storage manager 122 to assist with appraisal step 340. Differential storage manager 122 stores the persistence factor 282 data along with the "script.js" stored resource 280. The rendering engine also determines that "icon.jpg" is not required for page layout, and this persistence factor is forwarded to differential storage manager 122 as well.

Without waiting for all the persistence factors to be determined, based on the received persistence factors, differential storage manager 122 directs placement manager 210 to move "script.js" from its current location to a dedicated store (220B), according to step 350.

Additionally, because of the persistence factor indicating high importance, placement manager 210 attaches to "script.js" a post processed version 286 of the script, in the form of a pre-compiled version of the script. The next time the script is required, a full just in time compilation from scratch will not have to be performed. Similar savings could result from attaching other post-processed forms to the script.

As the example system operates, due to increased usage a large amount of cache entries are evicted based on their persistence scores, including "icon.jpg" and "page.html." Because "script.js" has been placed by placement manager 210 in a separate subcache 220A, is has not been evicted.

The next time the user visits this page, "page.html" is not in the cache, and is thus fetched. Then the renderer engine decodes the page and finds out that "icon.jpg" and "script.js" are required as well. With this execution however, "script.js" is still in the cache, along with the precompiled version, and "icon.jpg" has stored persistence factors to guide its display.

After receiving the pre-compiled version of script.js, The JAVASCRIPT engine then displays the page without receiving "icon.jpg." Because, as determined initially, when "icon.jpg" was appraised according to step 340, the image was not required for page layout, cache user 130 is able to better determine when to block the display of a page, and when to display the page with missing resources.

In this example, embodiments have prevented the eviction of a critical resource (script.js) that would block the layout of an entire page, while evicting and allowing a page to be displayed without, a non-critical resource (icon.jpg).

VII. Method

Figure 5:
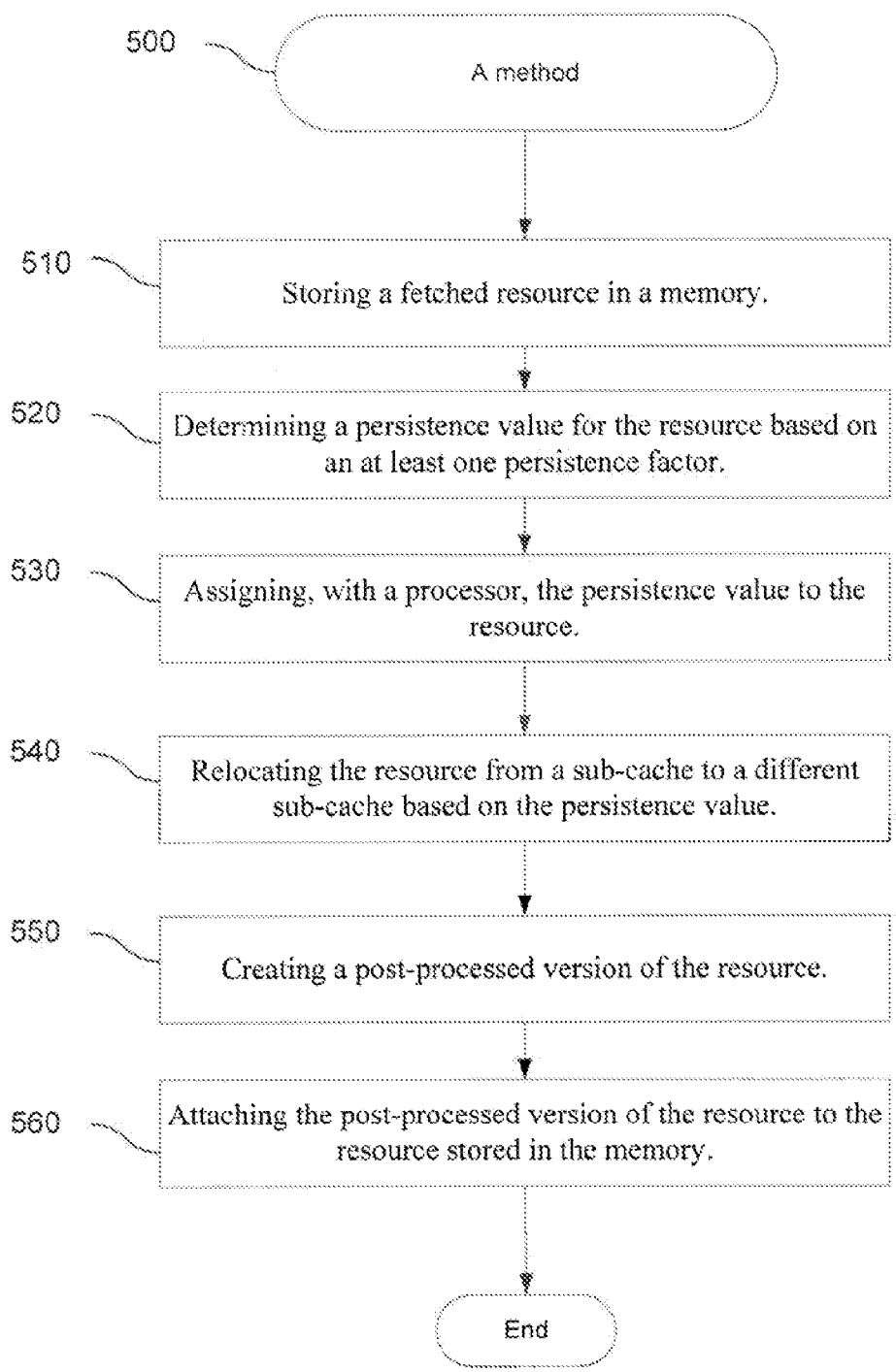
FIG. 5 is a diagram that shows a computer-implemented method of differential storage and eviction for data resources in a cache according to an embodiment of the present invention.

In FIG. 5, a method used, in an embodiment, of differential storage and eviction for information resources from a browser cache is depicted in a flowchart 500. In step 510, in an embodiment, the first step is to store a fetched resource in a memory. Next, in an embodiment, in step 520, determining a persistence score for the resource based on an at least one persistence factor. Then, in an embodiment, in step 530, assign, with a processor, the persistence score to the resource. In step 540, in an embodiment, relocate the resource from a sub-cache to a different sub-cache based on the persistence score. After step 550, in an embodiment, in step 550, create a post-processed version of the resource. Finally, in an embodiment, in step 560, attach the post-processed version of the resource to the resource stored in the memory.

VIII. Example Computer System Implementation

Figure 6:
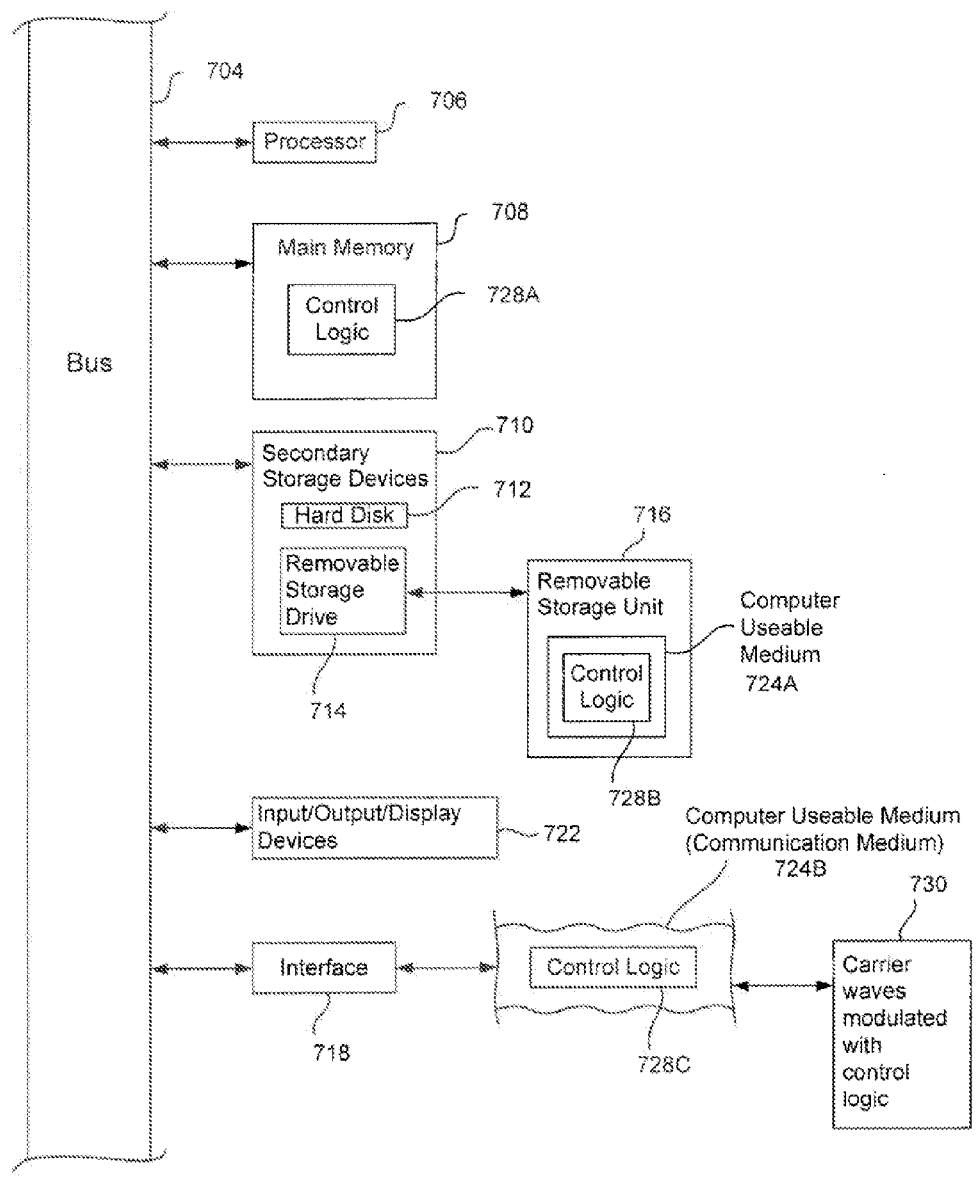
FIG. 6 is a diagram of an example computer system that may be used to implement embodiments of the present invention.

Embodiments described herein may be implemented using hardware, software or a combination thereof and may be implemented in a computer system or other processing system. Hardware, software or any combination of such may embody any of the modules in FIGS. 1-2A, 6 and any stage in FIGS. 3-5. In an embodiment, the invention is directed toward a computer program product executing on a computer system capable of carrying out the functionality described herein. This applies to any of the servers and/or clients in system 100. An example of a computer system 600 is shown in FIG. 6. Computer system 600 includes one or more processors, such as processor 606. Processor 606 is connected to a communication bus 604. Various software embodiments are described in terms of this example computer system. After reading this description, it will be appreciated by persons skilled in the relevant art, how to implement the invention using other computer systems and/or computer architectures.

Computer system 600 also includes a main memory 608, preferably random access memory (RAM), and may also include a secondary memory 610. Secondary memory 610 may include, for example, a hard disk drive 612 and/or a removable storage drive 614, representing a floppy disk drive, a magnetic tape drive, an optical disk drive, etc. Removable storage drive 614 reads from and/or writes to a removable storage unit 618 in a well-known manner. Removable storage unit 618, represents magnetic tape, optical disk, memory card, etc. which is read by and written to by removable storage drive 614. As will be appreciated, removable storage unit 618 includes a computer usable storage medium having stored therein computer software and/or data.

In alternative embodiments, secondary memory 610 may include other similar means for allowing computer programs or other instructions to be loaded into computer system 600. Such means may include, for example, a removable storage unit 622 and an interface 620. Examples of such may include a removable memory chip (such as an EPROM, or PROM) and associated socket, and other removable storage units 622 and interfaces 620 which allow software and data to be transferred from removable storage unit 622 to computer system 600.

Computer system 600 may also include a communication interface 624. Communication interface 624 enables computer system 600 to communicate with external and/or remote devices. For example, communication interface 624 allows software and data to be transferred between computer system 600 and external devices. Communication interface 624 also allows computer system 600 to communicate over communication networks, such as LANs, WANs, the Internet, etc. Communication interface 624 may interface with remote sites or networks via wired or wireless connections. Examples of communications interface 624 may include a modem, a network interface (such as an Ethernet card), a communications port, a PCMCIA slot and card, etc. Computer system 600 receives data and/or computer program products via communication network 624. Software and data transferred via communications interface 624 are in the form of signals 628 which may be electronic, electromagnetic, optical or other signals capable of being received by communications interface 624. Signals 628 are provided to communications interface 624 via a communications path (i.e., channel) 626. This channel 626 carries signals 628 and may be implemented using wire or cable, fiber optics, a phone line, a cellular phone link, an RF link and other wired or wireless communications channels.

In this document, the terms "computer program medium" and "computer usable medium" are used to generally refer to media such as removable storage drive 614, and a hard disk installed in hard disk drive 612. These computer program products are means for providing software to computer system 600.

Computer programs (also called computer control logic) are stored in main memory 608 and/or secondary memory 610. Computer programs may also be received via signal 628 and communications interface 624. Such computer programs, when executed, enable computer system 600 to perform the features of the present invention as discussed herein. In particular, the computer programs, when executed, enable processor 606 to perform the features of the present invention. Accordingly, such computer programs represent controllers of computer system 600.

In an embodiment where the invention is implemented using software, the software may be stored in a computer program product and loaded into computer system 600 using removable storage drive 614, hard disk drive 612 or communications interface 624. The control logic (software), when executed by processor 606, causes processor 606 to perform the functions of the invention as described herein.

Computer system 600 also includes input/output/display devices 632, such as monitors, keyboards, pointing devices, etc.

The invention may work with software, hardware, and operating system implementations other than those described herein. Any software, hardware, and operating system implementations suitable for performing the functions described herein may be used.

IX. Conclusion

Embodiments described herein provide differential storage and eviction of information resources from a browser cache. The summary and abstract sections may set forth one or more but not all exemplary embodiments of the present invention as contemplated by the inventors, and thus, are not intended to limit the present invention and the claims in any way.

The embodiments herein have been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

The foregoing description of the specific embodiments will so fully reveal the general nature of the invention that others may, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the claims and their equivalents.

What is claimed is:

1. A computer-implemented method for caching information resources for a web browser in a web browser cache, comprising:
   storing a fetched resource in the web browser cache, wherein the fetched resource comprises a script in a web page;
   determining at least one characteristic of the stored fetched resource, the at least one characteristic comprising a likelihood of the fetched resource being shared among a plurality of related web pages and a pause in the display of the web page caused by execution of the script;

assigning, with a processor, a persistence score to the stored fetched resource based on the determined at least one characteristic of the stored fetched resource including the likelihood of the fetched resource being shared among the plurality of related web pages and the pause in the display of the web page caused by the execution of the script; and removing the stored fetched resource from the web browser cache based on the persistence score assigned to the stored fetched resource.

2. The computer-implemented method of claim 1, further comprising:

after the assigning step, modifying the assigned persistence score for the stored fetched resource based on a pre-determined persistence score modifier.

3. The computer-implemented method of claim 1, further comprising:

after the assigning step, modifying the assigned persistence score for the stored fetched resource based on an at least one persistence factor.

4. The computer-implemented method of claim 3, wherein one of the at least one persistence factors is the importance of the resource.

5. The computer-implemented method of claim 3, wherein one of the at least one persistence factors is the retrieval cost of the resource.

6. The computer-implemented method of claim 3, wherein one of the at least one persistence factors is a characteristic of the source of the resource.

7. The computer-implemented method of claim 3, wherein one of the at least one persistence factors is a usage pattern of the resource.

8. The computer-implemented method of claim 3, wherein one of the at least one persistence factors is a layout determining characteristic of the resource.

9. The computer-implemented method of claim 3, wherein one of the at least one persistence factors is a likelihood that the resource will delay the loading of an associated browser page.

10. The computer-implemented method of claim 3, further comprising:

before the determining a persistence score step, receiving information corresponding to persistence factors from a renderer, based on the use of the resource by the renderer.

11. The computer-implemented method of claim 1, wherein the at least one characteristic of the stored fetched resource comprises a type of the stored fetched resource.

12. The computer-implemented method of claim 1, further comprising:

forwarding the resources to a renderer before the persistence score is assigned.

13. The computer-implemented method of claim 1, further comprising:

after the assigning step, appending the persistence score to the stored fetched resource.

14. The computer-implemented method of claim 1, further comprising:

after the assigning step, storing, in a memory, the persistence score.

15. The computer-implemented method of claim 1, further comprising:

creating a post-processed version of the stored fetched resource; and attaching the post-processed version of the stored fetched resource to the stored fetched resource stored in the web browser cache.

16. The computer-implemented method of claim 15, wherein the post-processed version comprises one of the following:

a pre-compiled version of an executable resource; and a version of the resource converted into a different format;

17. The computer-implemented method of claim 1, wherein the web browser cache comprises a cache having a plurality of sub-caches.

18. The computer-implemented method of claim 17, further comprising:

after the assigning step, relocating the stored fetched resource from a sub-cache to a different sub-cache based on the persistence score.

19. The computer-implemented method of claim 17, further comprising:

after the assigning step, relocating the stored fetched resource from a sub-cache to a different sub-cache based on at least one persistence factor.

20. The computer-implemented method of claim 17, wherein each of the plurality of sub-caches only stores certain respective types of content.

21. The computer-implemented method of claim 17, wherein a first sub-cache of the plurality of sub-caches has a different eviction policy from a second sub-cache of the plurality of sub-caches.

22. The method of claim 17, further comprising:

initially storing the fetched resource in a sub-cache of the plurality of sub-caches based on a type of the fetched resource; and after the assigning step, relocating the stored fetched resource from the sub-cache to a different sub-cache based on at least one persistence factor.

23. A system for caching information resources in a browser cache, comprising:

one or more computing devices;

a web browser cache, implemented with the one or more computing devices, that is configured to store resources for a web page;

(b) a differential storage manager, implemented with the one or more computing devices, that is configured to store a fetched resource in the web browser cache, wherein the fetched resource comprises a script in the web page;

determine at least one characteristic of the stored fetched resource, the at least one characteristic comprising a likelihood of the fetched resource being shared among a plurality of related web pages and a pause in the display of the web page caused by execution of the script;

assign a persistence score to the stored fetched resource based on the determined at least one characteristic of the stored fetched resource including the likelihood of the fetched resource being shared among the plurality of related web pages and the pause in the display of the web page caused by the execution of the script; and an eviction manager, configured to remove the stored fetched resource from the web browser cache based on the persistence score assigned to the stored fetched resource.

24. The system of claim 23, wherein the differential storage manager is further configured to modify the assigned persistence score for the stored fetched resource based on a predetermined persistence score modifier for the stored fetched resource.

25. The system of claim 23, wherein the differential storage manager is further configured to modify the assigned persistence score based on at least one persistence factor.

26. The system of claim 23, wherein the differential storage manager is further configured to use one or more post-processing modules to generate a post-processed version of the stored fetched resource.

27. The system of claim 26, wherein the differential storage manager is further configured to either append the post-processed version of the stored fetched resource to the stored fetched resource.

28. The system of claim 23, wherein the web browser cache comprises a plurality of sub-caches.

29. The system of claim 28, wherein the differential storage manager further comprises:
    a placement manager, configured to relocate the stored fetched resource from one of the plurality of sub-caches, to another one of the plurality of sub-caches, based on the persistence score.

30. A computer program product comprising:
    a non-transitory computer readable storage medium having computer readable program code embodied therein for causing a processor to execute the computer readable program code for caching information resources for a web browser in a web browser cache, the computer readable program code comprising:
    computer readable program code configured to cause the processor to store a fetched resource in the web browser cache, wherein the fetched resource comprises a script in a web page;
    computer readable program code configured to cause the processor to determine at least one characteristic of the stored fetched resource, the at least one characteristic comprising a likelihood of the fetched resource being shared among a plurality of related web pages and a pause in the display of the web page caused by execution of the script;
    computer readable program code configured to cause the processor to assign a persistence score to the stored fetched resource based on the determined at least one characteristic of the stored fetched resource including the likelihood of the fetched resource being shared among the plurality of related web pages and the pause in the display of the web page caused by the execution of the script;
    computer readable program code configured to cause the processor to remove the stored fetched resource from the web browser cache based on the persistence score assigned to the stored fetched resource.

* * * * *